United States Patent
Klein et al.

(10) Patent No.: US 12,115,756 B2
(45) Date of Patent: Oct. 15, 2024

(54) MULTILAYER FILM WITH ELECTRICALLY SWITCHABLE OPTICAL PROPERTIES AND IMPROVED ELECTRICAL CONTACTING

(71) Applicant: SAINT-GOBAIN GLASS FRANCE, Courbevoie (FR)

(72) Inventors: Marcel Klein, Baesweiler (DE); Sebastian Schurse, Übach-Palenberg (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 704 days.

(21) Appl. No.: 17/255,805

(22) PCT Filed: Jun. 6, 2019

(86) PCT No.: PCT/EP2019/064744
§ 371 (c)(1),
(2) Date: Dec. 23, 2020

(87) PCT Pub. No.: WO2020/001949
PCT Pub. Date: Jan. 2, 2020

(65) Prior Publication Data
US 2021/0268774 A1    Sep. 2, 2021

(30) Foreign Application Priority Data

Jun. 28, 2018 (EP) .................................. 18180268

(51) Int. Cl.
*B32B 17/10*   (2006.01)
*G02F 1/1334*   (2006.01)
*H05B 3/84*   (2006.01)

(52) U.S. Cl.
CPC .. *B32B 17/10036* (2013.01); *B32B 17/10504* (2013.01); *B32B 17/10761* (2013.01);
(Continued)

(58) Field of Classification Search
CPC ............... G02F 1/1334; G02F 1/13756; G02F 2203/03; B32B 17/10036;
(Continued)

(56) References Cited

U.S. PATENT DOCUMENTS

| | | | |
|---|---|---|---|
| 5,888,627 A | 3/1999 | Nakatani | |
| 6,056,861 A | 5/2000 | Fuhr et al. | |

(Continued)

FOREIGN PATENT DOCUMENTS

| | | |
|---|---|---|
| CN | 102209830 A | 10/2011 |
| CN | 104582956 A | 4/2015 |

(Continued)

OTHER PUBLICATIONS

English language translation of WIPO Patent Publication No. WO2014072137, published on May 15, 2014; downloaded from https://worldwide.espacenet.com/ on Aug. 7, 2023; translation provided with Google Translate tool onsite. (Year: 2014).*

(Continued)

*Primary Examiner* — Angela K Davison
(74) *Attorney, Agent, or Firm* — Pillsbury Winthrop Shaw Pittman LLP (57) ABSTRACT

A multilayer film with electrically switchable optical properties, includes arranged areally in the following order a first carrier film, a first electrically conductive layer, an active layer, a second electrically conductive layer, and a second carrier film. The multilayer film has within its area at least one first cutout and the at least one first cutout protrudes in the form of a through-hole through all layers of the multilayer film, the first cutout is filled with an electrically conductive filler compound, which electrically conductingly contacts the first electrically conductive layer within the first cutout, and a first busbar electrically conductingly contacts the electrically conducting filler compound.

18 Claims, 3 Drawing Sheets

(52) U.S. Cl.
CPC ........ *G02F 1/1334* (2013.01); *B32B 2305/55* (2013.01); *B32B 2605/006* (2013.01); *H05B 3/84* (2013.01)

(58) Field of Classification Search
CPC ........ B32B 17/10495; B32B 17/10504; B32B 17/10761; B32B 17/10229; B32B 17/10779; B32B 2305/55; B32B 2605/006; B32B 2605/08; B32B 3/266; B32B 3/08
See application file for complete search history.

(56) References Cited

U.S. PATENT DOCUMENTS

| | | |
|---|---|---|
| 2003/0019859 A1 | 1/2003 | Sol |
| 2004/0227462 A1 | 11/2004 | Utsumi et al. |
| 2009/0303565 A1 | 10/2009 | Karmhag et al. |
| 2012/0026573 A1 | 2/2012 | Collins et al. |
| 2014/0211129 A1* | 7/2014 | Bowser ................ G02F 1/1333 349/86 |
| 2016/0138328 A1 | 5/2016 | Behmke et al. |
| 2018/0031933 A1* | 2/2018 | Osawa ...................... B32B 7/04 |
| 2018/0303565 A1 | 10/2018 | Griffiths |

FOREIGN PATENT DOCUMENTS

| | | |
|---|---|---|
| DE | 10 2008 026339 A1 | 12/2009 |
| DE | 20 2008 017 611 U1 | 4/2010 |
| EP | 0 847 965 B1 | 6/1998 |
| EP | 0 876 608 B1 | 11/1998 |
| EP | 1 862 849 A1 | 12/2007 |
| EP | 2 139 049 A1 | 12/2009 |
| EP | 2 200 097 A1 | 6/2010 |
| JP | 2002-244152 A | 8/2002 |
| JP | 2006-030838 A | 2/2006 |
| JP | 2010-232249 A | 10/2010 |
| KR | 10-2015-0092247 A | 8/2015 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2012/052315 A1 | 4/2012 |
| WO | WO 2013/104438 A1 | 7/2013 |
| WO | WO 2013/104439 A1 | 7/2013 |
| WO | WO 2014/072137 A1 | 5/2014 |
| WO | WO 2017/142050 A1 | 8/2017 |
| WO | WO 2017/157626 A1 | 9/2017 |
| WO | WO 2018/017651 A1 | 1/2018 |

OTHER PUBLICATIONS

International Search Report as issued in International Patent Application No. PCT/EP2019/064744, dated Sep. 4, 2019.

First Office Action as issued in Chinese Patent Application No. 201980002136.7, dated Jul. 26, 2022.

Notice of Reasons for Rejection as issued in Japanese Patent Application No. 2020-572734, dated Mar. 22, 2022.

* cited by examiner

MULTILAYER FILM WITH ELECTRICALLY SWITCHABLE OPTICAL PROPERTIES AND IMPROVED ELECTRICAL CONTACTING

CROSS-REFERENCE TO RELATED APPLICATIONS

This application is the U.S. National Stage of PCT/EP2019/064744, filed Jun. 6, 2019, which in turn claims priority to European patent application number filed 18180268.7 filed Jun. 28, 2018. The content of these applications are incorporated herein by reference in their entireties.

The invention relates to a multilayer film with electrically switchable optical properties, a composite pane including such a multilayer film, and a method for production thereof and use thereof.

Glazings with electrically switchable optical properties are known. Such glazings contain a functional element that typically contains an active layer between two surface electrodes. The optical properties of the active layer can be altered by applying a voltage to the surface electrodes. PDLC (polymer dispersed liquid crystal) elements, whose active layer comprises liquid crystals embedded in a polymer matrix, are among the electrically switchable functional elements used in particular in the automotive sector. PDLC functional elements, for example, are known from DE 102008026339 A1. SPD functional elements (suspended particle device), known, for example, from EP 0876608 B1 and WO 2011033313 A1, are another example. The voltage applied allows the transmittance of visible light through PDLC or SPD functional elements to be controlled. Glazings with such functional elements can therefore be conveniently darkened electrically.

Electrically switchable functional elements are often provided as multilayer films. The actual functional element is arranged between two polymeric carrier films. Such multilayer films enable simplified production of an electrically switchable glazing. Typically, the multilayer film is laminated between two glass panes using conventional methods, producing a composite pane with electrically switchable optical properties. In particular, the multilayer films can be purchased commercially such that the glazing manufacturer itself does not have to produce the switchable functional element per se.

To realize the switching operation, the functional element must be electrically conductively contacted by connecting an external voltage source to the surface electrodes of the functional element. For the targeted contacting of a surface electrode, it must first be exposed out of the multilayer film. In a first step, a carrier film of the multilayer film including the surface electrode situated on the carrier film must be cut back. The active layer thus exposed is removed, for example, by mechanical wiping using a solvent. After removal of the active layer, the adjacent surface electrode appears and can be electrically conductingly contacted. This procedure includes a large number of manual steps that can be automated only with unsatisfactory results or not at all. In particular, the cleaning step for removal of the active layer must be considered critical. On the one hand, the active layer must be completely removed to enable good contacting. On the other, the mechanical stress on the surface electrode must be minimized to avoid possible damage. Such damage can already be triggered by the particles of the active layer itself. For example, just the crystals contained in a PDLC layer are enough to scratch the surface electrode during the wiping of the PDLC layer. These scratches lead to locally elevated power consumption, to heating induced thereby, and ultimately to component failure.

Multilayer films including an active layer that is controlled via two surface electrodes adjacent thereto on one carrier film in each case are known. Patterning of such multilayer films is possible through the introduction of de-coated separating lines into the surface electrodes, with the electrically conductive layer that serves as a surface electrode being removed or decomposed in the region of the separating lines. According to WO 2014/072137, this is particularly advantageously possible using a laser that is focused on the corresponding surface electrode through one of the carrier films.

US 2018/0031933 A1 discloses optical displays including liquid crystal layers. A contact hole filled with a conductive material is placed in the edge region of the display in a region outside the liquid crystal layer.

US 2003/0019859 A1 discloses a heatable vehicle window that is equipped with an electrically conductive coating. The electrically conductive coating is contacted via busbars, with the effect described that when the busbars are heated, a portion of the conductive material of the busbars penetrates into the layers of the electrically conductive coating.

U.S. Pat. No. 5,888,627 describes printed circuit boards that have contact holes in the board substrate, wherein the contact holes are filled with an electrically conductive resin component.

The object of the present invention is to provide a multilayer film having electrically switchable optical properties, which has improved electrical contacting, a composite pane including such a multilayer film, as well as an economical method for production thereof. The method should enable automated electrical contacting of the multilayer film while avoiding the disadvantages of the prior art.

The object of the present invention is accomplished according to the invention by a multilayer film with electrically switchable optical properties, a composite pane including such a multilayer film, a method for production thereof, and use thereof according to the independent claims 1, 12, 13, and 15. Preferred embodiments of the invention emerge from the dependent claims.

The multilayer film according to the invention with electrically switchable optical properties comprises at least one first carrier film with a first electrically conductive layer, an active layer, a second electrically conductive layer, and a second carrier film. The first electrically conductive layer is arranged on the first carrier film, whereas the second electrically conductive layer is situated on a surface of the second carrier film. In the layer stack, the first and the second electrically conductive layer are arranged adjacent the active layer of the multilayer film and serve it as surface electrodes. The multilayer film according to the invention has at least one first cutout, which, in the form of a through-hole, protrudes through all layers of the multilayer film. The first cutout is filled with an electrically conductive filler compound. The electrically conductive filler compound electrically conductingly contacts the first electrically conductive layer within the first cutout. On the lateral surface of the cutout, the electrically conductive filler compound makes direct contact with the layer cross-section and, thus, at least with the first electrically conductive layer, resulting in corresponding electrical contacting. A first busbar is placed on one of the outer surfaces of the first or second carrier film in the region of the first cutout and electrically conductingly contacts the electrically conducting filler compound. Consequently, an electrical voltage can be applied on the first electrically conductive layer via the first busbar. The structure of the multilayer film according to the invention enables improved electrical contacting since the electrically conductive layer cannot be damaged during manual ablation of the active layer necessary according to the prior art. Moreover, due to the structure according to the invention, a high degree of production process automation is possible.

The cutout corresponds in its shape to a general cylinder comprising two opposing base surfaces and a lateral surface. The base surfaces can be circular, elliptical, or polygonal. Preferably, the base surfaces are circular, elliptical, or quadrangular, wherein even substantially angular bases can have rounded corners. Rounded or round shapes are particularly advantageous. The layer stack of the multilayer film usually has high stiffness. Rounded corners or round cutouts enable simpler removal of the separated parts from the cutout, with increased pressure in the corner region and resultant damage avoided due to this shape. Also, round or rounded geometries are advantageous for ensuring gap-free filling of the cutout with the electrically conductive filler compound. In this regard, cutouts with circular or elliptical base surfaces have proven to be particularly suitable. Likewise, in the context of simplified producibility, the preferred selection of the two base surfaces of the cutout is congruent. The cutout is introduced within the surface of the multilayer film. The cutout thus does not border on the circumferential edge of the multilayer film and is surrounded along its wall (lateral surface) by the multilayer film. The cutout thus constitutes a hollow space, which is open at at least one of the base surfaces to the surface of one of the carrier films facing away from the electrically conductive layer. This geometric description of the at least one first cutout applies not only to this, but also to other first cutouts as well as to second or additional cutouts.

Electrical contacting of the second electrically conductive layer can be done analogously to the contacting of the first electrically conductive layer or, alternatively, also by means of measures known to the person skilled in the art.

Preferably, the electrical contacting of the second surface electrode of the multilayer film is done analogously to the contacting of the first surface electrode. For this, the multilayer film has within its area at least one second cutout in the form of a contact hole penetrating through all layers of the multilayer film, wherein the second cutout is also filled with an electrically conductive filler compound. The electrically conductive filler compound electrically conductingly contacts the second electrically conductive layer within the second cutout. A second busbar on the outer surface of the first or second carrier film is contacted with the electrically conducting filler compound of the second cutout. Thus, both electrodes (electrically conductive layers) of the multilayer film can be contacted in a simple manner.

The first and the second cutouts are in the form of through-holes. Alternatively, partial cutouts would be possible; however, they are more complex to realize. The at least one first cutout and the at least one second cutout are, for this reason, implemented as through-holes that protrude through all layers of the multilayer film. They thus extend continuously between the outer surface of the first carrier film facing the surroundings and the outer surface of the second carrier film facing the surroundings. This is particularly advantageous since a through-hole can be realized with simple technical means and the portion of the multilayer film to be removed can be removed with little effort. In contrast, when a cutout is not continuous, the portion of the multilayer film to be removed adheres to the inner base of the cutout on the remaining film components.

The electrically conducting connection between a busbar and the conductive layer to be contacted by this busbar is done according to the invention exclusively via the filler compound within the cutout. There is no direct areal contacting of the busbar and the electrically conductive layer associated therewith. Thus, removal of the carrier films can be dispensed with.

If both cutouts are implemented as through-holes protruding through all layers of the multilayer film, a short-circuit between the surface electrodes of the multilayer film should be avoided. For this purpose, the first electrically conductive layer and the second electrically conductive layer are electrically insulated from one another. This is possible using various measures. For example, a self-adhesive insulating film can be inserted into the corresponding regions of the cutout. Preferably, however, at least one layer-free separating line is introduced into the first electrically conductive layer and at least one layer-free separating line is introduced into the second electrically conductive layer. Within the first electrically conductive layer, at least one separating line separates an electrically insulated edge region including at least one second cutout or at least one first cutout from the primary surface of the first electrically conductive layer. In the second electrically conductive layer, at least one layer-free separating line separates that one of the at least one first cutout or of the at least one second cutout from the primary surface of the second electrically conductive layer that is not already separated from the primary surface of the first electrically conductive layer by a separating line in the first electrically conductive layer. This creates an electrically insulated edge region including at least one cutout in the second electrically conductive layer as well. Since the separating line in the second electrically conductive layer is selected adjacent the cutout (or group of cutouts), around which no separating line runs within the first electrically conductive layer, this ensures that no direct contacting of the first and second electrically conductive layer occurs and that a short-circuit of the surface electrodes is avoided.

The first busbar and the second busbar can be placed, independently of one another, selectively, on the outer surface of the first carrier film, of the second carrier film, or in each case one busbar on the first and on the second carrier film. Referred to here as the "outer surface of the carrier films" is the surface that has no electrically conductive layer and faces away from the active layer of the multilayer film. Since the cutouts are realized as through-holes, the surface on which the busbars are positioned is freely selectable since the electrically conductive filler compound within the cutouts is accessible from both film surfaces. If a cutout were not continuous, the corresponding busbar would, of course, have to be placed on the surface on which the electrically conductive filler compound is accessible.

The de-coating of individual separating lines in the electrically conductive layer is preferably done by a laser beam. Methods for patterning thin metal films are known, for example, from EP 2 200 097 A1 or EP 2 139 049 A1. The width of the de-coating is preferably 10 µm to 1000 µm, particularly preferably 30 µm to 200 µm, and in particular 70 µm to 140 µm. In this range, a particularly clean and residue-free de-coating by the laser beam takes place. De-coating by laser beam is particularly advantageous since the de-coated lines are optically very inconspicuous and adversely impact the appearance and the through-vision only a little.

In a preferred embodiment, at least two first cutouts and at least two second cutouts are in each case made in the multilayer film. There are thus two groups of cutouts which are differentiated depending on which of the electrically conductive layers an electrical contact is established with via the electrically conductive filler compound. When a plurality of first or second cutouts are used, the electrical contacting of the electrically conductive layers is done at not only one single contact point. Thus, a more uniform current flow along the surface electrodes and an associated improved switching behavior of the active layer of the multilayer film can be obtained.

Preferably, multiple first cutouts and multiple second cutouts are made in the multilayer film. The first cutouts run substantially along the first busbar, whereas the second cutouts run substantially along the second busbar. This yields multiple electrical contacting points between surface electrodes and busbars along the busbars, by means of which a uniform circuit diagram of the active layer is obtained.

In an advantageous embodiment, the cutouts are arranged along the entire length of the busbar, wherein the distance between two adjacent first cutouts along the first busbar and/or the distance between two adjacent second cutouts along the second busbar is between 2 mm and 200 mm, preferably between 5 mm and 100 mm, particularly preferably between 10 mm and 50 mm. These ranges have proven particularly advantageous in terms of homogeneous switching behavior.

Experiments for contacting switchable multilayer films have shown that, usually, sufficiently good contacting can be achieved even using a single first cutout and a single second cutout. In such a case, all the electric power flows via this single cutout, as a result of which undesirable local heating can occur. This can be avoided by providing multiple first cutouts and multiple second cutouts, since the electric power is distributed over multiple contact points (cutouts) and the heating per contact point is correspondingly lower. Furthermore, improved homogeneity of the power supply over the area of the multilayer film can be expected with an increasing number of cutouts. In the case of a PDLC element as a multilayer film, this is expressed in that less turbidity occurs in the transparent switched state. In PDLC elements, the liquid crystals contained in the active layer of the multilayer film orient themselves parallel to one another upon application of a voltage, as a result of which the transmittance of light through the multilayer film is increased. Turbidity is undesirable in this transparent switched state. Through the use of multiple contact points (cutouts) per busbar, undesirable residual turbidity can be prevented.

The number of cutouts should nevertheless be kept as low as possible in view of production costs. The inventors discovered that good results can be obtained with a number of at least one cutout per 200 mm of length along which a multilayer film is to be contacted and switched. Particularly preferably, over a length of 100 mm, 1 to 10, in particular 2 to 8, for example, 6 cutouts are provided for contacting.

The electrically conductive filler compound is a metal paste containing at least one conductive metal or a conductive metal alloy. Preferably, the electrically conductive metal paste is a silver paste. In the context of the invention, commercially available silver printing pastes are suitable for use on glass as an electrically conductive filler compound. These are well known to the person skilled in the art.

The first electrically conductive layer and the second electrically conductive layer contain at least one metal, one metal alloy, or one transparent conductive oxide, preferably one transparent conductive oxide, and have a thickness of 10 nm to 2 µm. The electrically conductive layers are preferably transparent. Here, "transparent" means permeable to electromagnetic radiation, preferably electromagnetic radiation of a wavelength of 300 nm to 1300 nm and in particular to visible light. Electrically conductive layers according to the invention are known, for example, from DE 20 2008 017 611 U1, EP 0 847 965 B1, or WO2012/052315 A1. They typically contain one or a plurality, for example, two, three, or four electrically conductive, functional individual layers. The functional individual layers preferably contain at least one metal, for example, silver, gold, copper, nickel, and/or chromium, or a metal alloy. The functional individual layers particularly preferably contain at least 90 wt.-% of the metal, in particular at least 99.9 wt.-% of the metal. The functional individual layers can be made of the metal or of the metal alloy. The functional individual layers particularly preferably contain silver or a silver-containing alloy. Such functional individual layers have particularly advantageous electrical conductivity with, at the same time, high transmittance in the visible spectral range. The thickness of a functional individual layer is preferably from 5 nm to 50 nm, particularly preferably from 8 nm to 25 nm. In this thickness range, advantageously high transmittance in the visible spectral range and particularly advantageous electrical conductivity are obtained.

The electrically conductive layer can, in principle, be any layer that can be electrically contacted.

Preferably, the first carrier film and/or the second carrier film contain at least one polymer that does not melt completely in the autoclave process, preferably polyethylene terephthalate (PET). Particularly preferably, the first and the second carrier film are made of a PET film. The carrier films according to the invention are preferably transparent. The thickness of the carrier films is preferably from 0.025 mm to 0.400 mm, in particular from 0.050 mm to 0.200 mm. The electrically conductive layers according to the invention are preferably arranged on a surface of the carrier film, in other words, on precisely one of the two sides of the carrier film (i.e., on its front side or its back side). The carrier films are organized in the layer stack of the multilayer film such that the electrically conductive layers are arranged adjacent the active layer and act as its surface electrodes.

Depending on the design of the active layer, the multilayer film can yield a wide variety of electrically switchable functional elements known to the person skilled in the art. The active layer is preferably an SPD, a PDLC, an electrochromic, or an electroluminescent layer.

An SPD (suspended particle device) functional element contains an active layer comprising suspended particles, with the absorption of light by the active layer being variable by application of a voltage to the surface electrodes. The change in absorption is based on the alignment of the rod-shaped particles in the electric field when electric voltage is applied. SPD functional elements are known, for example, from EP 0876608 B1 and WO 2011033313 A1.

A PDLC (polymer dispersed liquid crystal) functional element contains an active layer including liquid crystals that are embedded in a polymer matrix. When no voltage is applied to the surface electrodes, the liquid crystals are randomly oriented, resulting in strong scattering of the light passing through the active layer. When a voltage is applied to the surface electrodes, the liquid crystals align themselves in one common direction and the transmittance of light through the active layer is increased. Such a functional element is known, for example, from DE 102008026339 A1.

In an electrochromic functional element, the active layer of the functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any displays can be shown.

The invention relates moreover to a composite pane at least including the multilayer film according to the invention. The multilayer film is laminated between a first pane and a second pane via a first thermoplastic film and a second thermoplastic film. The thermoplastic films ensure the bonding of the carrier film of the multilayer film to the glass panes of the composite pane.

The first thermoplastic film and a second thermoplastic film are suitable, due to their thermoplastic properties, to produce an adhesive bond to one another and to adjacent panes and/or adjacent functional elements. During the lamination operation, the thermoplastic films began to flow under the effect of heat, as a result of which they adhere to adjacent elements and are bonded to them and to one another. Preferably, the first and the second thermoplastic film contain polyvinyl butyral (PVB), ethylene vinyl acetate (EVA), and/or polyurethane (PU), particularly preferably PVB. These materials are common for the thermoplastic intermediate layer of composite panes and produce an adhesive bond to glass. Thus, a good bond is ensured.

The first pane and/or the second pane preferably contain glass, particularly preferably flat glass, float glass, quartz glass, borosilicate glass, soda lime glass, or clear plastics, preferably rigid clear plastics, in particular polycarbonate, polymethyl methacrylate, and/or mixtures thereof. The first pane and/or the second pane are preferably transparent, in particular for use of the pane as a windshield or rear window of a vehicle or other uses in which high light transmittance is desirable. In the context of the invention, "transparent" means a pane having transmittance of more than 70% in the visible spectral range. However, for panes that are not situated in the traffic-relevant field of vision of the driver, for example, for roof panels, the transmittance can also be much lower, for example, greater than 5%. On the outer surfaces of the first and the second pane, any number of additional panes can, in principle, be arranged and joined thereto by lamination with interposition of thermoplastic films or also via spacers in the case of an insulating glazing unit.

The thickness of the first pane and/or of the second pane is between 0.3 mm and 25 mm, with pane thickness highly dependent on the application of the pane.

For applications in the field of building glazing, the pane thicknesses can, for example, be in the range from 2 mm to 10 mm.

Particularly in the automotive sector, there has been in recent years a trend toward increasingly lower glass thicknesses, enabling savings in terms of vehicle weight. The pane thicknesses of an automobile glazing, in particular a windshield are, for the inner pane, usually in the range from 0.3 mm to 2.5 mm and, for the outer pane, in the range from 0.8 mm to 2.5 mm. An asymmetric thickness combination, in which the thickness of the outer pane is greater than the thickness of the inner pane, is, especially with a low total thickness, advantageous in terms of improved stability of the composite pane.

In a preferred embodiment, the composite pane is a windshield, wherein the thickness of the outer pane is between 0.8 mm and 2.1 mm and the thickness of the inner pane is between 0.5 mm and 1.8 mm.

In another preferred embodiment of the invention, the composite pane is a roof panel of a motor vehicle, wherein the thickness of the outer pane is between 1.1 mm and 2.1 mm and the thickness of the inner pane is between 0.5 mm and 1.6 mm.

The composite glass is, in its embodiment as a vehicle glazing, preferably bent in one or more spatial directions, as is customary for motor vehicle panes, with typical radii of curvature in the range from approx. 10 cm to approx. 40 m. The composite glass can, however, also be flat, for example, when it is intended as a pane for buses, trains, tractors, or as building glazing.

The first pane and/or the second pane can be thermally or chemically tempered, partially tempered, or non-tempered.

The composite glass can also be provided with an additional function, in that the thermoplastic intermediate layer has functional inclusions, for example, inclusions with IR absorbing, UV absorbing, coloring, or acoustic properties. The inclusions are, for example, organic or inorganic ions, compounds, aggregates, molecules, crystals, pigments, or dyes.

In particular with use of the composite pane according to the invention in vehicles, for example, as a windshield, it is advantageous to implement further functions in order to reduce the negative effects of weathering influences such as strong solar radiation or ice formation. For this, so-called low-E coatings and/or heatable coatings can be applied to the inner side of the inner pane or of the outer pane. Suitable material compositions of an electrically heatable coating that also functions as a low-E coating can be found, for example, in WO 2013/104439 and WO 2013/104438.

The invention is further accomplished by a method for producing a multilayer film according to the invention with electrically switchable optical properties. Herein, first, a multilayer film comprising, arranged areally in the following order, a first carrier film, a first electrically conductive layer, an active layer, a second electrically conductive layer, and a second carrier film, is provided. At least one first cutout is produced in the multilayer film as a through-hole. The cutouts can be produced with various cutting techniques known to the person skilled in the art. Preferably, the cutouts are produced by punching or laser cutting. This at least one first cutout is filled with an electrically conductive filler compound, wherein the electrically conductive filler compound fills the cutout substantially completely. Thus, the electrically conductive filler compound is in direct contact with the first electrically conductive layer, or if the cutout is implemented as a through-hole, also with the second electrically conductive layer of the layer stack. Before or after the filling of the cutout with the electrically conductive filler compound, a first busbar is mounted on the outer surface of the first carrier film in the region of the first cutout. The electrically conductive filler compound is electrically contacted with the first busbar.

In a preferred embodiment of the method, before, during, or after the creation of the first cutout, at least one second cutout is created. In the region of the second cutout, the carrier films, the active layer, and the electrically conductive layers are removed in the form of a through-hole. The at least one second cutout is filled with an electrically conductive filler compound and a second busbar is mounted on the outer surface of the second carrier film in the region of the electrically conductive filler compound and electrically contacted with the electrically conducting filler compound. The order of these two steps is variable. At least the second electrically conductive layer is consequently contacted with the second busbar via the electrically conductive filler compound.

Preferably, the busbar is placed on the cutouts before they are filled. Thus, in each case one opening of the cutouts is closed by a busbar. The electrically conductive filler compound is filled via the opening of the cutout that is not covered by a busbar. This is advantageous since the filler compound, in its non-cured state adheres to the adjacent busbar that covers the cutout and also makes electrical contact therewith. Consequently, an additional step for the electrical contacting of the busbar and the electrically conductive filler compound is no longer required.

Alternatively, the busbar can also be electrically conductingly connected to the filler compound by other measures known to the person skilled in the art, for example, an electrically conductive adhesive or a solder connection.

If the first and the second cutout are created according to the invention in the form of through-holes, the filler compound introduced into the cutouts first makes contact with the first and the second electrically conductive layer. In this case, a de-coated separating line is created in one of the two electrically conductive layers in the vicinity of the cutouts. The separating lines are introduced such that the first cutout/first cutouts are in contact with only one of the electrically conductive layers and the second cutout/second cutouts are in contact with only the other electrically conductive layer. The de-coating of individual separating lines in the electrically conductive layer is preferably done by a laser beam.

The separating lines can be created at any point during the method. The separating lines are preferably created by means of a laser through the carrier film positioned closest to the electrically conductive layer to be processed. The wavelength of the laser radiation of a laser with which the separating lines are introduced into the electrically conductive layer must be suitably chosen such that the electrically conductive layer has sufficiently high absorption of the laser radiation and that the carrier film has sufficiently low absorption of the laser radiation. Thus, the separating line is advantageously introduced selectively in the electrically conductive layer without the carrier film being damaged. Care must be taken that through the focusing of the laser radiation, the power density in the electrically conductive layer is clearly greater than in the carrier layer.

It has proven advantageous to select the wavelength of the radiation of the laser when creating the separating lines in the range from 150 nm to 1200 nm, preferably in the range from 200 nm to 500 nm, particularly preferably in the range from 250 nm to 400 nm. It has been shown that this wavelength range is particularly suitable when using customary electrically conductive layers and customary carrier films. The wavelength range of the laser is selected such that the separating lines are selectively made in the electrically conductive layers.

The first and the second electrically conductive layer are deposited on the carrier films prior to step a) by a method known per se. Reference is made by way of example to magnetron-enhanced cathodic sputtering. This is particularly advantageous in terms of simple, quick, economical, and uniform coating of the substrate. However, the electrically conductive coating can also be applied, for example, by vapor deposition, chemical vapor deposition (CVD), plasma-enhanced chemical vapor deposition (PECVD) or by wet chemical methods.

Methods for applying active layers, for example, SPD, PDLC, electrochromic, or electroluminescent layers are known to the person skilled in the art and are sufficiently described in the literature.

The multilayer film produced in the method according to the invention can be integrated into a composite pane by methods known to the person skilled in the art.

The first and the second pane of the composite pane can be bent, for example, when used as vehicle glazing. The panes can be bent individually or together. Preferably, the panes are congruently bent together (i.e., simultaneously and by the same tool) since, thus, the shape of the panes is optimally matched to one another for the subsequent lamination.

If the composite pane is to function as bent vehicle glazing, at least the pane used as the outer pane is subjected to a bending process prior to lamination. In a preferred embodiment, the pane used as the inner pane is also subjected to a bending process. This is, in particular, advantageous in the case of strong bends in multiple spatial directions (so-called three-dimensional bends).

Alternatively, the pane used as the inner pane is not pre-bent. This is particularly advantageous in the case of panes with very low thicknesses since they have film-like flexibility and can thus be adapted to the pre-bent outer pane without having to be pre-bent themselves.

The bonding of the first pane and the second pane to form a composite pane is preferably done under the action of heat, vacuum, and/or pressure. Methods known per se for producing a composite pane can be used.

For example, so-called autoclave methods can be carried out at an elevated pressure of approx. 10 bar to 15 bar and temperatures from 130° C. to 145° C. over approx. 2 hours. Vacuum bag or vacuum ring methods known per se operate, for example, at approx. 200 mbar and 80° ° C. to 110° C. The first pane, the thermoplastic films, the multilayer film present at least in sections, and the second pane can also be pressed in a calender between at least one pair of rollers to form a pane. Systems of this type for producing panes are known and normally have at least one heating tunnel upstream before a pressing facility. The temperature during the pressing operation is, for example, from 40° C. to 150° C. Combinations of calender and autoclave processes have particularly proven their worth in practice. Alternatively, vacuum laminators can be used. These consist of one or a plurality of heatable and evacuable chambers, in which the first pane and the second pane are laminated within, for example, approx. 60 minutes at reduced pressures of 0.01 mbar to 800 mbar and temperatures from 80° ° C. to 170° C.

Another aspect of the invention includes the use of the composite pane according to the invention in buildings, in particular in the access area, window area, roof area, or façade area as a built-in part in furniture and appliances, in means of transportation for travel on land, in the air, or on water, in particular in trains, watercraft, and motor vehicles, for example, as a windshield, rear window, side window, and/or roof panel.

In the following, the invention is explained in detail with reference to drawings and exemplary embodiments. The drawings are schematic representations and not true to scale. The drawings in no way restrict the invention.

They depict.

Figure 1A:
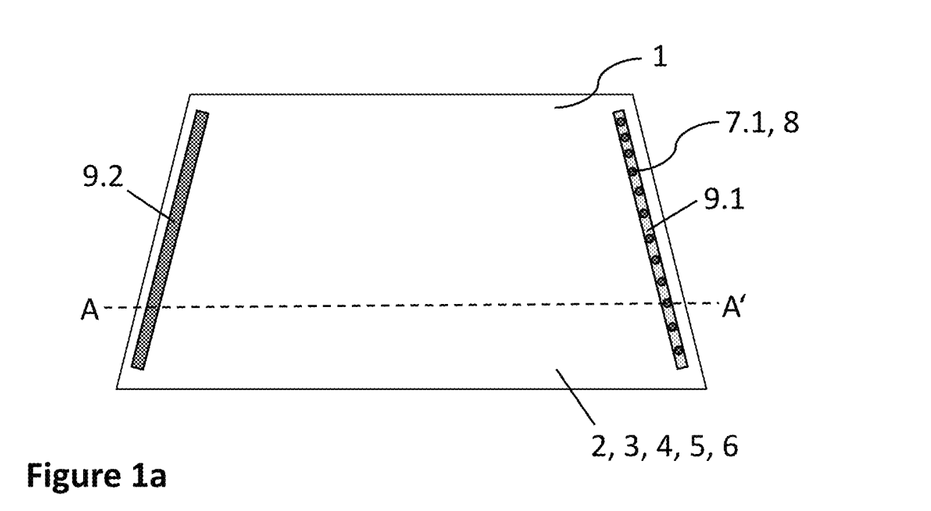
FIG. 1a a plan view of a multilayer film 1 according to the invention with electrically switchable optical properties, wherein the electrically conductive layers 3 and 4 are contacted with busbars 9.1 and 9.2 via an electrically conductive filler compound 8, FIG. 1b a cross-section through the multilayer film 1 of FIG. 1a along the section line AA', FIG. 2 the composite pane 11 according to the invention including the multilayer film 1 of FIGS. 1a and 1b, which is laminated between the two panes 12, 13 by means of two thermoplastic films 14, 15, shown along the section line AA' analogously to FIG. 1a, FIG. 3 an embodiment of the method according to the invention.
Figure 1B:
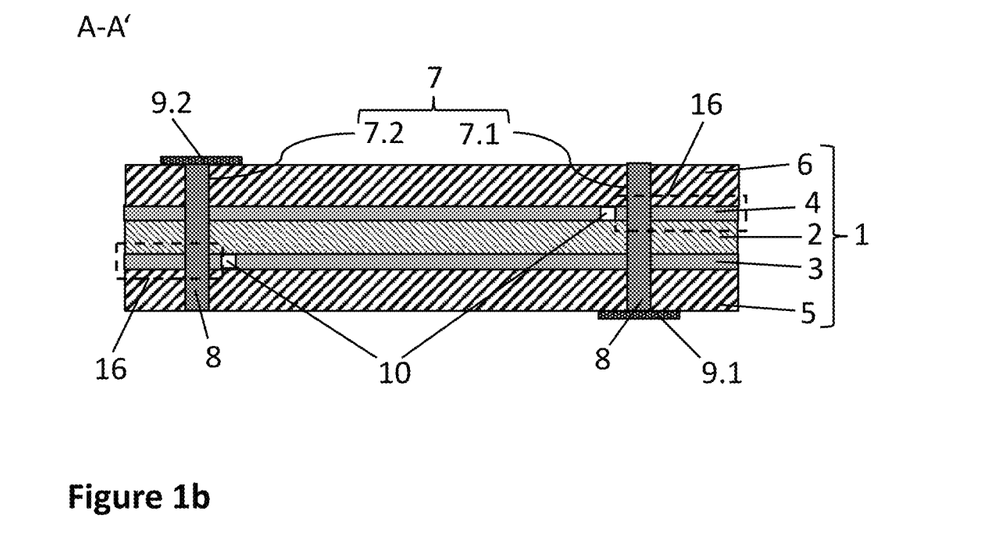

FIGS. 1a and 1b depict a multilayer film 1 according to the invention with electrically switchable optical properties. The multilayer film 1 comprises a first carrier film 5 and a second carrier film 6, wherein a first electrically conductive layer 3 is applied on a surface of the first carrier film 5, whereas a surface of the second carrier film 6 has a second electrically conductive layer 4. An active layer 2 is situated between the electrically conductive layers 3, 4. The active layer 2 is a PDLC layer. The carrier films 5, 6 are made in each case of a PET film with a thickness of 200 μm. The electrically conductive layers 3, 4 are layer systems that contain, for example, three electrically conductive silver layers that are separated from one another by dielectric layers. In the vicinity of two opposing edges of the multilayer film 1, a row of first cutouts 7.1 is made along one edge, and a row of second cutouts 7.2 is made along the opposite edge. In the region of the cutouts 7, the layer stack comprising the first carrier film 5, the first electrically conductive layer 3, the active layer 2, the second electrically conductive layer 4, and the carrier film 6 is completely removed. The first cutouts 7.1 and the second cutouts 7.2 are, consequently, made as through-holes. The cutouts 7 have a diameter of 6 mm and are arranged along the respective busbar 9, substantially parallel to the closest edge of the multilayer film 1. The first cutouts 7.1 have a distance of approx. 16.7 mm between them (in each case to the most closely adjacent cutout). The second cutouts 7.2 also have, analogously, a distance of approx. 16.7 mm between each other. In the region of the first cutouts 7.1, a first busbar 9.1 is arranged on the outer surface of the first carrier film 5. The first busbar 9.1 covers all of the first cutouts 7.1. In this context, "outer surface" of the carrier films refers to the surface facing away from the active layer. On the outer surface of the second carrier film 6, the cutouts 7.1 are exposed and not covered by a busbar. Via this opening, an electrically conductive filler compound 8, here a silver printing paste, was filled into the first cutouts 7.1. The electrically conductive filler compound 8 fills the first cutouts 7.1 substantially completely. The transition between the filler compound and the cross-section of the multilayer film 1 need not mandatorily be rectilinear. Depending on the configuration of the multilayer 1 and the filler compound 8, the silver printing paste can be locally delimited in the multilayer film 1, for example, penetrate into the active layer 2. Consequently, there is a large contact surface between the filler compound 8 and the multilayer film 1 such that a good mechanical and electrical connection is ensured. The filler compound 8 electrically conductingly contacts the first electrically conductive layer 3, and the second electrically conductive layer 4 contacts the first busbar 9.1. Analogously, a second busbar 9.2 is applied on the outer surface of the second carrier film 6 in the region of the second cutouts 7.2.

The second busbar 9.2 covers all the second cutouts 7.2. The cutouts 7.2 are exposed on the outer surface of the first carrier film 5 opposite the second busbar 9.2. Here, again, this opening can be used for filling with the electrically conductive filler compound 8 in the form of a silver printing paste. The electrically conductive filler compound 8 fills the second cutouts 7.2 substantially completely and can also spread, as described for the first cutouts 7.1, into parts of the multilayer film 1. The filler compound 8 within the second cutouts 7.2 establishes an electrical contact between the first electrically conductive layer 3, the second electrically conductive layer 4, and the second busbar 9.2. In order to avoid a direct electrical contact of the two busbars 9 and an associated short-circuit, one of the electrically conductive layers of, in each case, one of the busbars is electrically insulated such that each busbar is in contact with only one electrically conductive layer. In this case, a separating line 10 is introduced into the first electrically conductive layer 3, which line separates an electrically insulated edge region 16 including the second cutouts 7.2 from the remaining primary surface of the layer 3. There is thus no electrical contact between the primary surface of the first electrically conductive layer 3 and the second busbar 9.2 after introduction of the separating line 10. The primary surface of the first electrically conductive layer 3 is the surface between the separating line 10 situated therein and the first cutout 9.1. Analogously, in the second electrically conductive layer 4, a separating line 10 is introduced, which line separates an electrically insulated edge region 16 including the first cutouts 7.1, from the remaining primary surface of the electrically conductive layer 4. Thus, after introduction of the separating line 10, there is likewise no electrical contact between the primary surface of the second electrically conductive layer 4 and the first busbar 9.1. The separating lines 10 have a width of 200 μm. The primary surface of the second electrically conductive layer 4 is the surface between the separating line 10 situated therein and the second cutout 9.2. Generally, when contacting the electrically conductive layers, it must be ensured that exactly one busbar is associated with each electrically conductive layer. The busbars can either be arranged on the same carrier film or, as shown in FIG. 1b, be positioned on different carrier films. The busbars 9 have a length of 200 mm, measured along the cutouts 7 substantially parallel to the outer edge of the multilayer film 1. The present multilayer film is intended to be used as a sun visor of a motor vehicle. The busbars 9 are arranged such that, after lamination of the multilayer film in a composite pane and installation of the composite pane as a windshield in a motor vehicle body, they run along the pane edges adjacent the A-pillars. There are 12 first cutouts 7.1 arranged along the first busbar 9.1, while, analogously, there are 12 second cutouts 7.2 along the second busbar 9.2. Thus, good contacting of the respective electrically conductive layer 3, 4 can be ensured and uniform current distribution can be achieved.

The electrical contacting according to the invention of the electrically conductive layers of the multilayer film via the layer cross-section ensures mechanically stable contacting. Furthermore, damage to the electrically conductive layers is avoided. In comparison, in the prior art, damage to the electrically conductive layer to be exposed often occurs due to manual cutting back of the layer stack in the edge region and subsequent removal of the active layer. The active layer is usually removed by wiping with a solvent, wherein, for example, the liquid crystals contained in a PDLC layer can leave scratches in the underlying electrically conductive layer. Moreover, this step is difficult to automate since extreme care is necessary, on the one hand, to ensure complete removal of the active layer and, on the other, to avoid the described damage to the electrically conductive layer. Residues of the active layer and also scratches both have a significant negative impact on contact quality. The multilayer film according to the invention and the method according to the invention are superior to that since high contact quality without possible damage to the layers is ensured and the production of the multilayer film can be easily automated.

The multilayer film according to the invention of FIGS. 1a and 1b can be used in the conventional composite panes including multilayer films with electrically controllable optical properties known to the person skilled in the art. The dimensions of the multilayer film itself as well as the length of the busbars depend on the size of the desired application. Multilayer films with switchable optical properties are used, for example, as sun visors in windshields. In this case, the multilayer film is used only in the part of the composite pane in which the controllable optical properties are desired. In an application as a sun visor, based on the installed state of the windshield, this is usually the upper portion of the pane adjacent to the roof edge of the car body. Such a sun visor has, for example, a height of 20 cm. The multilayer film is accordingly cut to size. Also known, however, are applications in which the multilayer film is integrated into the composite pane over a large area. These include, for example, composite panes as a glass roofs of motor vehicles. Often, in such cases, a PDLC element is introduced in the entire translucent region of the composite pane. The invention improves, as described, the electrical contacting in all these exemplary embodiments.

Figure 2:
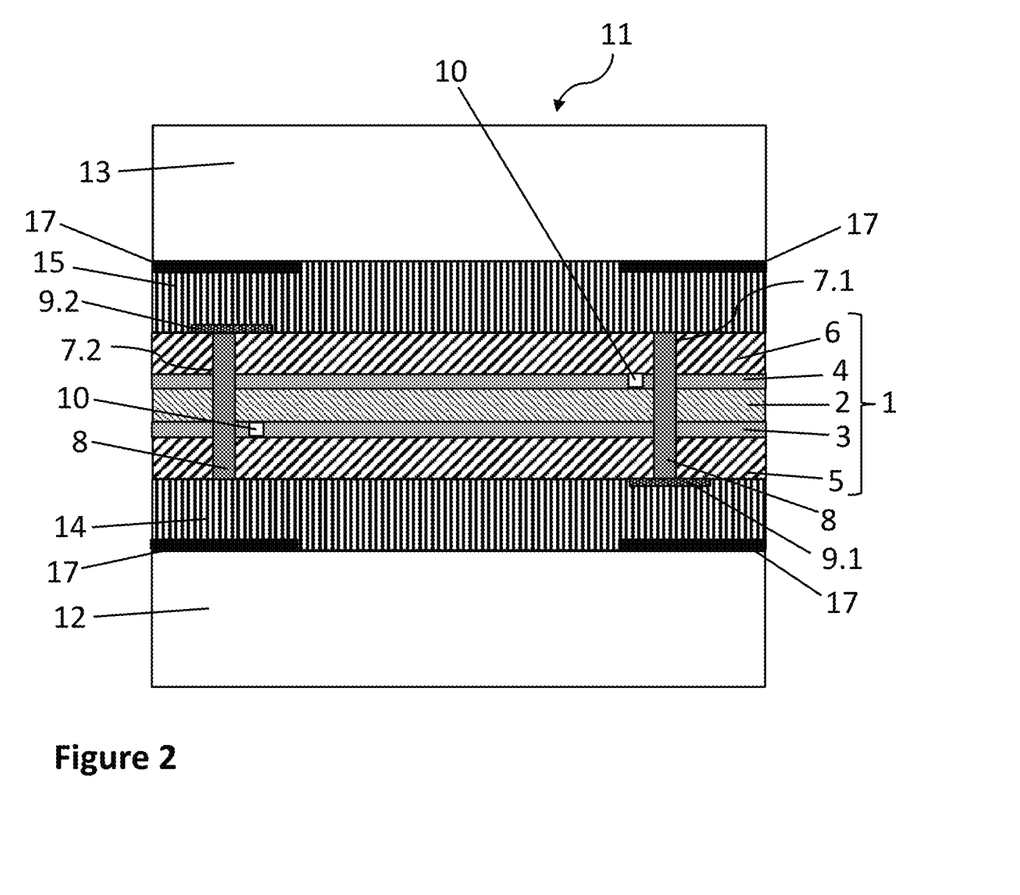

FIG. 2 depicts the composite pane 11 according to the invention, wherein the multilayer film 1 of FIGS. 1a and 1b is laminated between two panes 12, 13 via two thermoplastic films 14, 15. The view of FIG. 2 corresponds to a cross-section of the composite pane analogous to the cross-section depicted in FIG. 1a along the section line AA'. A first thermoplastic film 14 is placed on the first pane 12; the multilayer film 1 of FIGS. 1a and 1b follows the thermoplastic film 14. The multilayer film 1 is covered by a second thermoplastic film 15 and the layer stack is completed by the second pane 13. The thermoplastic films 14, 15 have in each case a thickness of 0.76 mm and are made of PVB. The panes 12 and 13 are made of glass. The multilayer film 1 can also be inserted only in parts of the composite pane 11. A preferred exemplary application is the use of multilayer films according to the invention as band filters of a windshield. In this case, the multilayer film 1 would be inserted only in the film composite in the region of the composite pane adjacent to the roof edge, based on the installed state of the glazing. In the remaining area of the windshield, the panes 12, 13 are joined only via the thermoplastic films 14, 15. Of course, optional additional elements, for instance, further electrically switchable multilayer films or other functional elements can be present. For the sake of simplification, a three-dimensional bend of the composite pane is not shown in FIG. 2. In particular, when the composite pane is used as a vehicle glazing, this is, however, preferably present. In the region of the cutouts, the panes 12, 13 can optionally be provided with an opaque coating 17. This masks the cutouts as well as the busbars such that these are not visible to the observer. Such masking by means of black printing is familiar to the person skilled in the art.

Figure 3:
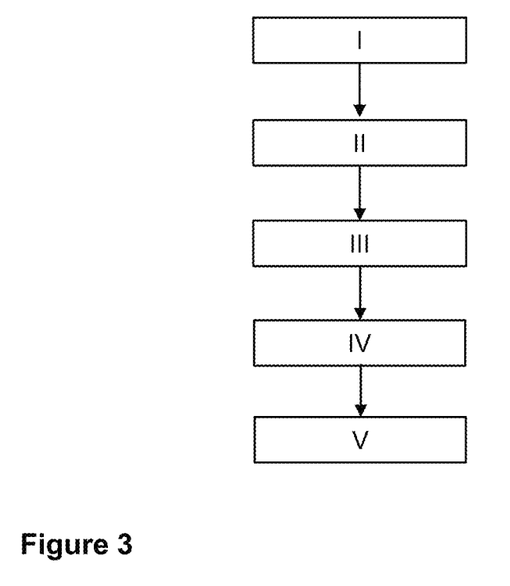

FIG. 3 depicts a preferred embodiment of the method, comprising the steps:

I Providing a multilayer film 1,

II Introducing a separating line 10 by laser in the first electrically conductive layer 3, which line separates an electrically insulated edge region 16 from the remaining area of the first electrically conductive layer 3, and Introducing a separating line 10 by laser in the second electrically conductive layer 4, which separates an electrically insulated edge region 16 from the remaining area of the second electrically conductive layer 4.

III Punching a plurality of first cutouts 7.1 in the form of through-holes in the electrically insulated edge region 16 which was produced in step II by a separating line 10 in the first electrically conductive layer 3 and Punching a plurality of second cutouts 7.2 in the form of through-holes in the electrically insulated edge region 16 which was produced in step II by a separating line 10 in the second electrically conductive layer, IV Placing a first busbar 9.1 on the outer surface of the first carrier film 5 in the region of the first cutouts 7.1 and fixing the busbar 9.1 by means of an adhesive strip and Placing a second busbar 9.2 on the outer surface of the second carrier film 6 in the region of the second cutouts 7.2 and fixing the busbar 9.2 by means of an adhesive strip, V Filling the first cutouts 7.1 and the second cutouts 7.2 with an electrically conductive filler compound 8.

The introduction of the separating lines per step II can be done at any time during the procedure. Preferably, the separating lines are introduced immediately after providing the multilayer film, since the multilayer film has, at this time, a completely flat surface and has no other components, such as busbars. This facilitates automated laser processing, especially in terms of automated film transport.

The resultant multilayer film 1 according to the invention has mechanically stable and reliable electrical contacting of the electrically conductive layers 3, 4 via the filler compound 8. Connecting the busbars 9.1, 9.2 to an external voltage source results in a voltage being applied to the electrically conductive layers 3, 4. The electrically conductive layers 3, 4 act as surface electrodes of the active layer 2 situated therebetween. The first busbar 9.1 contacts the second electrically conductive layer 4, while the first electrically conductive layer 3 contacts the second busbar 9.2.

LIST OF REFERENCE CHARACTERS 1 multilayer film with electrically switchable optical properties
2 active layer of the multilayer film 1
3 first electrically conductive layer of the multilayer film 1
4 second electrically conductive layer of the multilayer film 1
first carrier film of the multilayer film 1
6 second carrier film of the multilayer film 1
7 cutouts
7.1 first cutouts
7.2 second cutouts
8 electrically conductive filler compound
9 busbar
9.1 first busbar
9.2 second busbar 10 layer-free separating line
11 composite pane
12 first pane
13 second pane
14 first thermoplastic film
15 second thermoplastic film
16 electrically insulated edge region
17 opaque coating
A-A' section line

The invention claimed is:

1. A multilayer film with electrically switchable optical properties, at least comprising, arranged areally in the following order:
a first carrier film,
a first electrically conductive layer,
an active layer,
a second electrically conductive layer, and
a second carrier film,
wherein
the multilayer film has within its area at least one first cutout and the at least one first cutout protrudes in the form of a through-hole through all layers of the multilayer film such that the at least one first cutout penetrates into the active layer,
the first cutout is filled with an electrically conductive filler compound, which electrically conductingly contacts the first electrically conductive layer within the first cutout, and
a first busbar electrically conductingly contacts the electrically conducting filler compound,
wherein the multilayer film has within its area at least one second cutout in the form of a through-hole through all layers of the multilayer film, the second cutout is filled with an electrically conductive filler compound, which electrically conductingly contacts the second electrically conductive layer within the second cutout, and a second busbar electrically conductingly contacts the electrically conducting filler compound, and
wherein
the first and second cutouts protrude through all layers of the multilayer film, at least one first layer-free separating line is arranged in the first electrically conductive layer, wherein said at least one first layer-free separating line separates a first electrically insulated edge region comprising the at least one first cutout or the at least one second cutout from a primary surface of the first electrically conductive layer, and
at least one second layer-free separating line is arranged in the second electrically conductive layer, wherein said at least one second layer-free separating line separates a second electrically insulated edge region from a primary surface of the second electrically conductive layer, wherein the second electrically insulated edge region of the second electrically conductive layer includes those of the first and second cutouts that do not extend within the first electrically insulated edge region of the first electrically conductive layer.

2. The multilayer film according to claim 1, wherein an electrically conducting connection between the first and second busbars and the respective first and second electrically conductive layers occurs exclusively via the filler compound.

3. The multilayer film according to claim 1, wherein at least two first cutouts and at least two second cutouts are arranged in the multilayer film.

4. The multilayer film according to claim 3, wherein the first cutouts run substantially along the first busbar and the second cutouts run substantially along the second busbar.

5. The multilayer film according to claim 1, wherein the electrically conductive filler compound includes a metal paste containing at least one conductive metal or one conductive metal alloy.

6. The multilayer film according to claim 5, wherein the metal paste is a silver paste.

7. The multilayer film according to claim 1, wherein the first electrically conductive layer and the second electrically conductive layer contain at least one metal, one metal alloy, or one transparent conductive oxide and have a thickness of 10 nm to 2 µm.

8. The multilayer film according to claim 7, wherein the first electrically conductive layer and the second electrically conductive layer contain a transparent conductive oxide.

9. The multilayer film according to claim 1, wherein the first carrier film and/or the second carrier film contains at least one non-thermoplastic polymer.

10. The multilayer film according to claim 9, wherein the at least one non-thermoplastic polymer is a polyethylene terephthalate.

11. The multilayer film according to claim 1, wherein the active layer is an SPD, a PDLC, an electrochromic, or an electroluminescent layer.

12. A composite pane at least comprising, areally laminated to one another:
a first pane,
a first thermoplastic film,
the multilayer film according to claim 1,
a second thermoplastic film,
a second pane.

13. A method comprising utilizing a multilayer film according to claim 1 in motor vehicle glazings, building glazings in the interior or exterior.

14. The method according to claim 13, wherein the multilayer film is implemented in a motor vehicle glazing.

15. A multilayer film with electrically switchable optical properties, at least comprising, arranged areally in the following order:
a first carrier film,
a first electrically conductive layer,
an active layer,
a second electrically conductive layer, and
a second carrier film,
wherein
the multilayer film has within its area at least one first cutout and the at least one first cutout protrudes in the form of a through-hole through all layers of the multilayer film,
the first cutout is filled with an electrically conductive filler compound, which electrically conductingly contacts the first electrically conductive layer within the first cutout, and
a first busbar electrically conductingly contacts the electrically conducting filler compound, at least two first cutouts and at least two second cutouts are arranged in the multilayer film,
the at least two first cutouts run substantially along the first busbar and the at least two second cutouts run substantially along the second busbar, and
the at least two first and/or at least two second cutouts are arranged along the entire length of the busbar and wherein a distance between two adjacent first cutouts along the first busbar and/or a distance between two adjacent second cutouts along the second busbar is between 2 mm and 200 mm.

16. The multilayer film according to claim 15, wherein the distance between two adjacent first cutouts along the first busbar and/or the distance between two adjacent second cutouts along the second busbar is between 10 mm and 20 mm.

17. A method for producing a multilayer film with electrically switchable optical properties, the multilayer film including areally in the following order a first carrier film,
   a first electrically conductive layer,
   an active layer,
   a second electrically conductive layer, and
   a second carrier film,
the method comprising:
   a) providing the multilayer film,
   b) producing within an area of the multilayer film at least one first cutout that protrudes in the form of a through-hole through all layers of the multilayer film,
   c) filling the at least one first cutout with an electrically conductive filler compound, which electrically conductingly contacts the first electrically conductive layer within the first cutout, and
   d) applying a first busbar on an outer surface of the first carrier film in the region of the first cutout,
   wherein step d) occurs before or after step c) and wherein at least the first electrically conductive layer is electrically contacted with the first busbar via the electrically conductive filler compound.

18. The method according to claim 17, wherein before, during, or after step b), at least one second cutout is produced as a through-hole in the primary surface of the multilayer film,
   the at least one second cutout is filled with an electrically conductive filler compound, a second busbar is applied on an outer surface of the second carrier film in the region of the electrically conductive filler compound and is electrically contacted with the electrically conducting filler compound,
   wherein at least the second electrically conductive layer is contacted with the second busbar via the electrically conductive filler compound.

* * * * *